Aug. 25, 1931.     W. R. HUNGERFORD     1,820,703
COUPLING MECHANISM
Filed Aug. 1, 1928
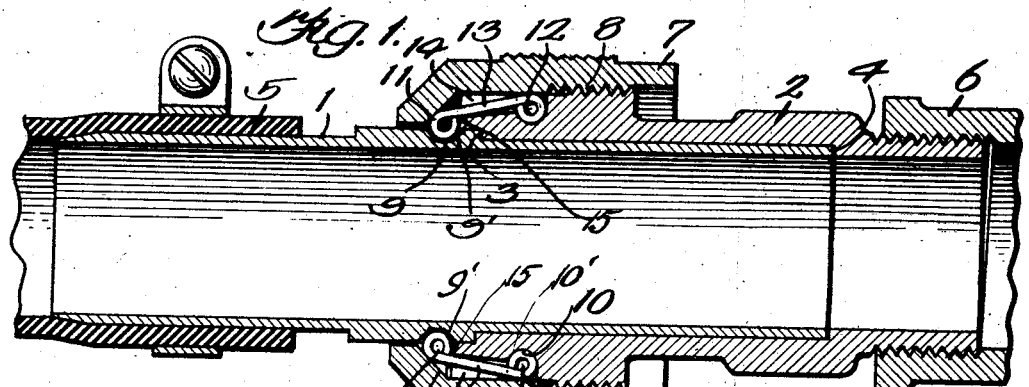
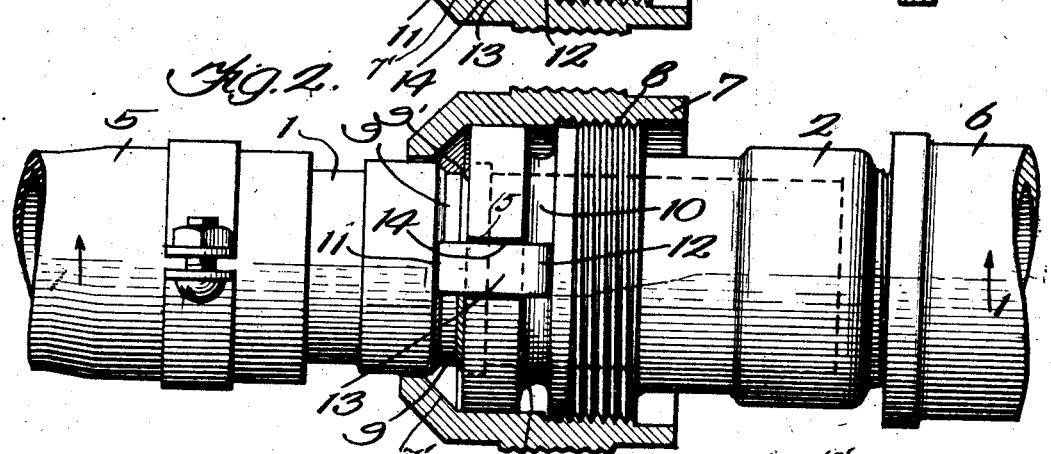
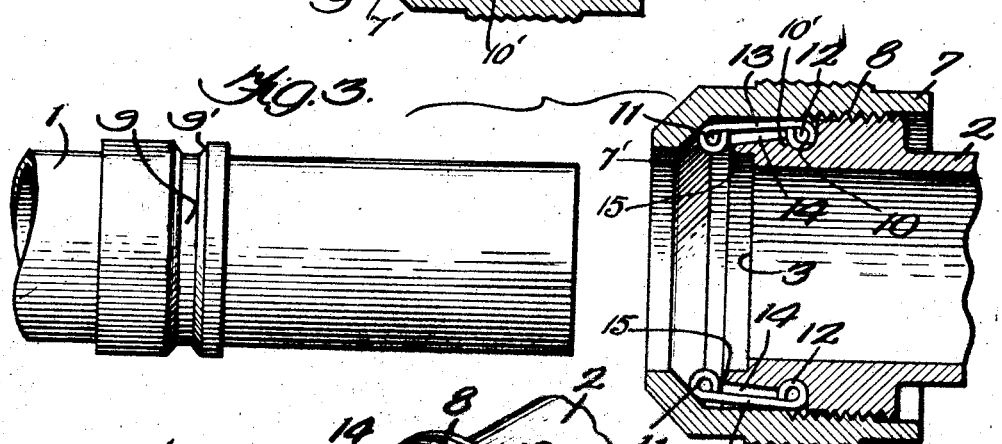
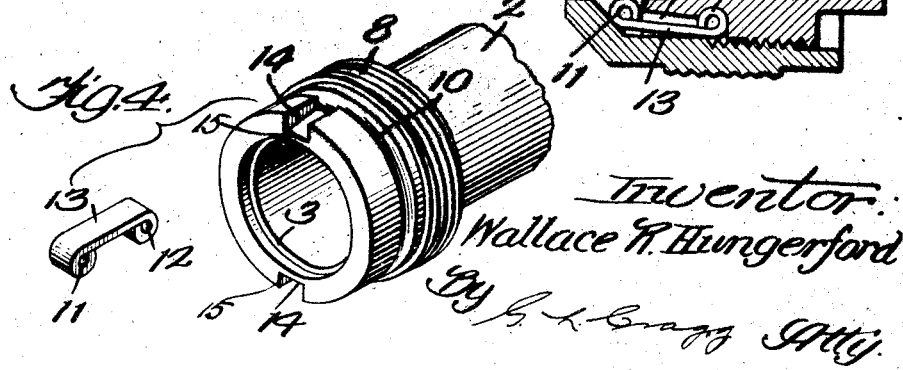
Inventor.
Wallace R. Hungerford Patented Aug. 25, 1931

1,820,703

UNITED STATES PATENT OFFICE

WALLACE R. HUNGERFORD, OF CHICAGO, ILLINOIS, ASSIGNOR, BY MESNE ASSIGNMENTS, TO LEONIDAS D. WOODRUFF, OF CHICAGO, ILLINOIS

COUPLING MECHANISM

Application filed August 1, 1928. Serial No. 296,671.

My invention relates to mechanism for coupling piping sections and is of particular service in uniting sections that are employed to convey air under pressure, though the invention is not to be thus limited.

The object of the invention is to provide a coupling which is generally of new and improved construction, may be manufactured at a low cost and is an improvement upon couplings of a similar character heretofore designed.

In carrying out my invention, a collar is screwed upon and about one of the piping sections and operates upon a link that serves to keep the piping sections in assembly. These piping sections are preferably in telescopic relation and have shoulders that may have abutting engagement, in which event, the collar surrounds both of the piping sections. There are preferably two coupling links, each having end portions placed between and clear of one of the shoulders that are provided upon the piping sections between such link end portions. The collar and links have cooperating cam formations which force movement of the links into position. The links are preferably formed from leaf springs the ends of which are desirably curled into the aforesaid link end portions. These links flex under the influence of the aforesaid collar to hold the collar from being easily loosened. The two pipe sections, when assembled by my device, are free to swivel with respect to each other.

The invention will be more fully explained in connection with the accompanying drawings in which Fig. 1 is a longitudinal sectional view illustrating the preferred embodiment of the invention; Fig. 2 is a view of the structure shown in Fig. 1 with most of the parts shown in elevation; Fig. 3 is a view partially in elevation and partially in section, showing parts of the device in separated relation; and Fig. 4 is a view illustrating one of the links and one of the piping sections in separated relation.

The invention is exemplified in connection with a pair of piping sections 1 and 2 which are arranged in telescopic relation and have coacting shoulder portions 3. The piping section 2 has a shoulder portion 4 which faces the adjacent end of the piping section 1 to enable the bores of both piping sections to be of uniform diameter, if desired. The piping section 1 is shown as being inserted within a rubber hose 5 which may lead to an air nozzle if the piping is used in connection with cleaning apparatus employing dust removing air. The piping section 2 is shown as being screwed into a piping section 6 which may, for example, communicate with a vacuum creating device or an air pressure pump. A knurled collar 7 surrounds both of the piping sections and is screwed upon the section 2 as shown, and as indicated at 8. Said piping sections 1 and 2 are formed with annular grooves 9 and 10 which receive the generally cylindrical end portions 11 and 12 of links 13. The intermediate portions of the links are contained within channels 14 that are formed in the outer end of the piping section 2 and communicate with said annular grooves. The walls of said grooves that lie between the end portions 11 and 12 of the links constitute shoulders upon which these link end portions operate to keep the piping sections in assembly but in a manner to keep the link end portions 11 free in the groove 9 receiving them to permit the piping sections 1 and 2 to swivel with respect to each other.

The cam end of the collar 7 presses upon the outer link end portions 11 to cause the links to flex sufficiently to hold said collar from being easily loosened. The straight portions of the links are pressed by said collar upon the shoulders 15 to produce the described flexing of the links whereby the collar is held from being easily turned.

The size of the link end portions 11 is such that they are not depressed by the collar 7 fully into the groove 9 and consequently the piping sections 1 and 2 are sufficiently free to permit them to swivel with respect to each other.

It will be seen that I have provided a piping structure employing two piping sections 1 and 2, a collar 7 screwed upon one of the piping sections, and one or more links 13, preferably formed of spring material, each having end portions 11 and 12 respectively facing shoulders 9', 10', that are provided between said link end portions respectively upon the piping sections, said collar having a cam formation 7' in engagement with one end portion 11 of each link to position this link end portion with respect to the shoulder 9' upon one of the piping sections 1, the other piping section 2 having a shoulder 15 pertaining to each link 13 and against which an intermediate portion of the adjacent link is pressed by the aforesaid cam formation 7' upon the collar whereby said link is flexed sufficiently to hold the collar from being easily turned. The shoulders 9', 10' are preferably relatively approachable to have a distance between them which is less than the effective distance between the link end portions of the adjacent link, one of said shoulders, the shoulder 9' as illustrated, extending laterally beyond the link faced thereby which is free of binding engagement with the piping section 1 carrying the shoulder 9', whereby relative swiveling movement between said piping sections is permitted. The entire structure is such that no rivet holes need be provided in either of the piping sections, a smooth bore in the piping being thus afforded.

Changes may be made without departing from the invention.

Having thus described my invention, I claim:

1. In a coupling of the character described, the combination of a pair of piping sections having telescopically connected ends and adapted to swivel relatively to one another, one of said sections being provided with an external screw thread and having formed therein a longitudinally extending channel leading to the end of said one section, the other section having formed therein an annular groove, a link for retaining the piping sections in connected relation formed of thin spring metal and comprising a flat central portion, said link being connected at one end thereof to the said one piping section and being arranged so that the central portion is disposed within the channel and its other end projects beyond the end of said one section, and a collar connected by an internal screw thread to the external screw thread on the said one section so that it is shiftable longitudinally by relative rotation thereof, and embodying a cam formation at one of its ends adapted to engage the said other end of the link and operative when the collar is screwed into place to force said other link-end into the groove, the channelled part of the said one section being so formed that when the collar is screwed into place the central portion of the link is deflected or distorted outwardly and causes the said other link-end to engage the collar yieldably and hold the same against rotation.

2. In a coupling of the character described, the combination of a pair of piping sections having telescopically connected ends and adapted to swivel relatively to one another, one of said sections being provided with an external screw thread and a shoulder and having formed therein a longitudinally extending channel extending from the shoulder to the end of said one section, the other section having formed therein an annular groove, a link for retaining the piping sections in connected relation formed of thin spring metal and comprising a flat central portion and enlarged ends, said link having one end thereof positioned in abutting relation with the shoulder and being arranged so that the central portion is disposed in the channel and its other end projects beyond the said one piping section, and a collar connected by an internal screw thread to the external screw thread on the said one section so that it is shiftable longitudinally by relative rotation thereof, and embodying a cam formation at one of its ends adapted to engage said other end of the link and operative when the collar is screwed into place to force said other link-end into the groove, the channelled part of the said one piping section being so formed that when the collar is screwed into place the central portion of the link is deflected or distorted outwardly and causes the ends to engage the collar yieldably and hold the same against rotation.

3. In a coupling of the character described, the combination of a pair of piping sections having telescopically connected ends and adapted to swivel relatively to one another, one of said sections being provided with an external screw thread and having formed therein an annular groove and a longitudinally extending channel extending from the groove to the end of said one section, the other section having formed therein an annular groove, a link for retaining the piping sections in connected relation formed of flat spring metal and having the ends thereof bent into substantially cylindrical form, said link having one end thereof disposed in the said one piping section and being arranged so that the central portion is positioned in the channel and its other end projects beyond said one section, and a collar connected by an internal screw thread to the external screw thread on the said one section so that it is shiftable longitudinally by relative rotation thereof, and embodying a cam formation at one of its ends adapted to engage the said other end of the link and operative when the collar is screwed into place to force said other link-end into the groove.

In witness whereof, I hereunto subscribe my name.

WALLACE R. HUNGERFORD.